(12) United States Patent
Yamamoto et al.

(10) Patent No.: US 7,292,634 B2
(45) Date of Patent: Nov. 6, 2007

(54) IMAGE CODING METHOD AND APPARATUS

(75) Inventors: Takahiro Yamamoto, Osaka (JP); Shinji Kitamura, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 846 days.

(21) Appl. No.: 10/662,515

(22) Filed: Sep. 16, 2003

(65) Prior Publication Data

US 2004/0057519 A1    Mar. 25, 2004

(30) Foreign Application Priority Data

Sep. 24, 2002 (JP) ............................. 2002-277191

(51) Int. Cl.
*H04N 7/18* (2006.01)
(52) U.S. Cl. ............................. 375/240.16; 375/240.19
(58) Field of Classification Search ..............................
375/240.01–240.29
See application file for complete search history.

(56) References Cited

U.S. PATENT DOCUMENTS

| | | | | |
|---|---|---|---|---|
| 5,477,272 A | * | 12/1995 | Zhang et al. | 375/240.06 |
| 5,796,434 A | * | 8/1998 | Lempel | 348/403.1 |
| 6,219,383 B1 | | 4/2001 | Park | |
| 2002/0057736 A1 | | 5/2002 | Fuji et al. | |

* cited by examiner

*Primary Examiner*—Andy Rao
(74) *Attorney, Agent, or Firm*—McDermott Will & Emery LLP (57) ABSTRACT

A motion detection block includes a wavelet transform section which receives a current image I1 and a reference image I2 as inputs. The motion detection section detects a motion vector using size-reduced images RI1 and RI2 generated by transform in the wavelet transform section. Thus, the search range of a motion vector can be apparently extended at the same processing amount.

16 Claims, 10 Drawing Sheets

FIG.9A  Reference frame (previous frame)

FIG.9B  Current frame

FIG.9C  Detected motion vector

FIG.9D  Reference frame motion-compensated using motion vector

FIG.9E  Difference between current frame and reference frame FIG.9F  Reference frame for comparison with subsequent frame

IMAGE CODING METHOD AND APPARATUS

BACKGROUND OF THE INVENTION

The present invention relates to moving picture coding for appropriately changing a coding scheme between intra-frame predictive coding (intra coding) utilizing spatial redundancy and inter-frame predictive coding (inter coding) utilizing time redundancy, and more particularly relates to a technique for achieving improvement of coding efficiency and fast coding processing (motion detection) in coding of an image with a fast motion.

Figure 8:
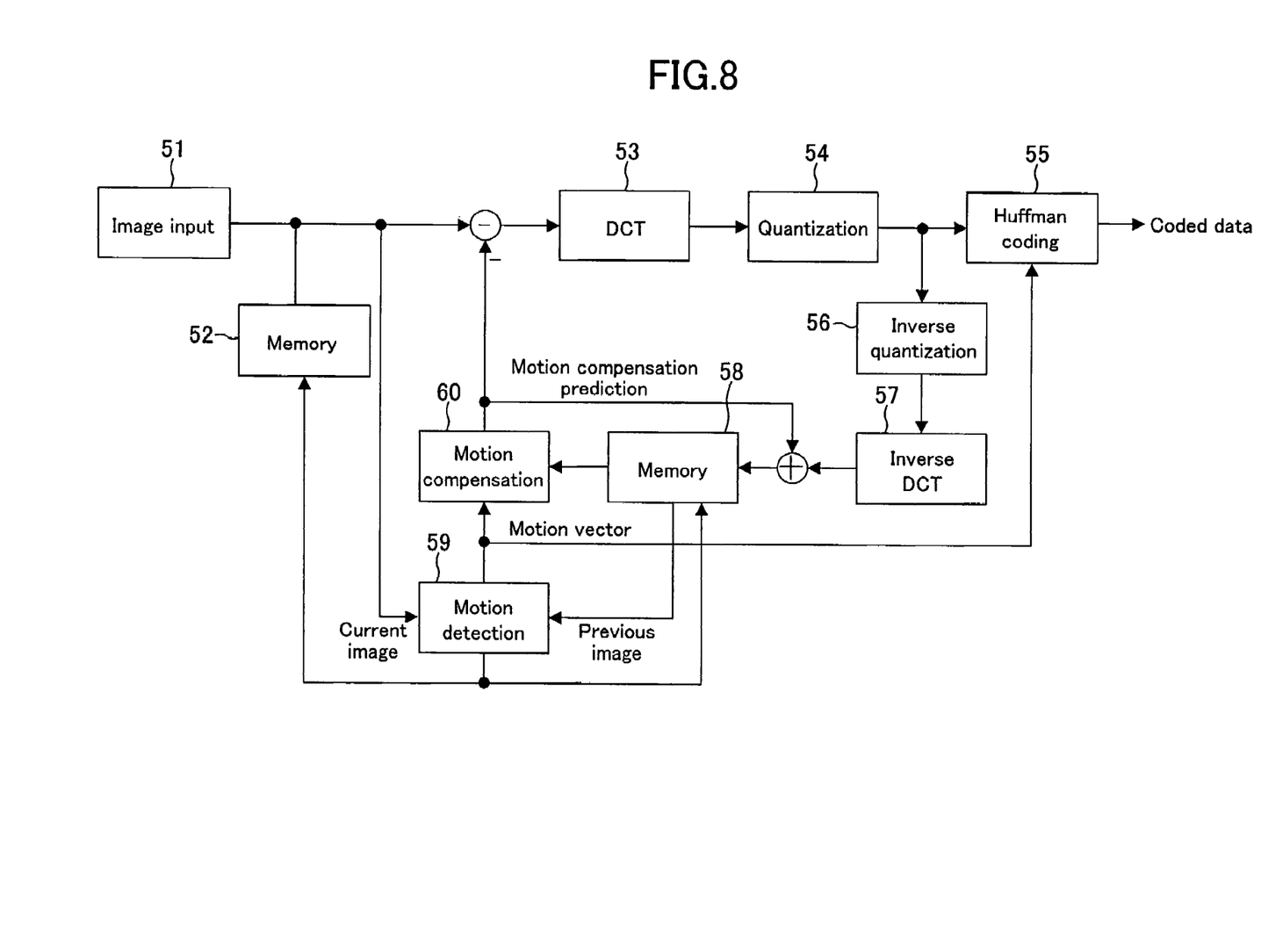
FIG. 8 is a block diagram illustrating the configuration of a known image coding apparatus.
Figure 9A:
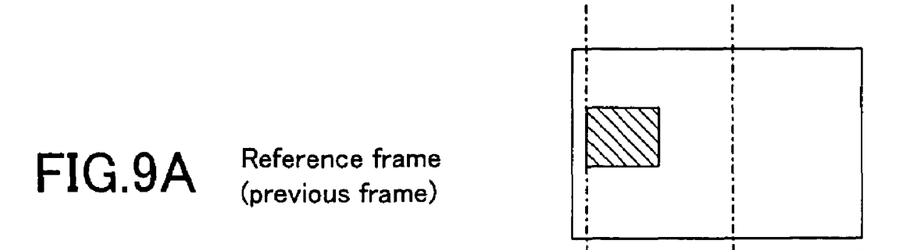
FIGS. 9A through 9F are illustrations for explaining frame predictive coding.
Figure 9B:
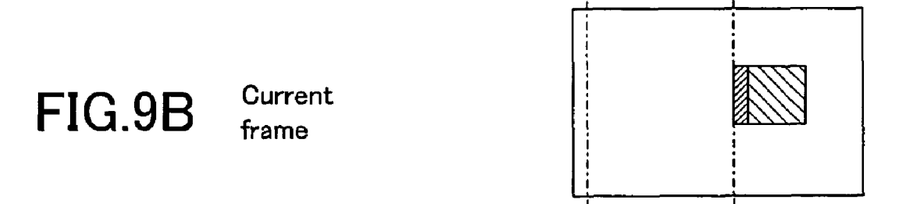

FIG. 8 is a block diagram illustrating an exemplary configuration of a known image coding apparatus (encoder). FIG. 9 is an illustration conceptually describing inter-frame predictive coding (inter coding). In FIG. 8, an image signal received from an image input section 51 is temporarily stored in a frame memory 52. In the case of intra coding, DCT (in a DCT section 53), quantization (in a quantizing section 54) and Huffman coding (in a Huffman coding section 55) are performed to 1-frame image data, that is, coding utilizing spatial redundancy in the same frame is performed. At this time, inverse quantization (in an inverse quantization section 56) and inverse DCT (in an inverse DCT section 57) are performed to quantized stream data, and then obtained data is stored, as a predictive reference image frame, in a frame memory 58.

Figure 9C:
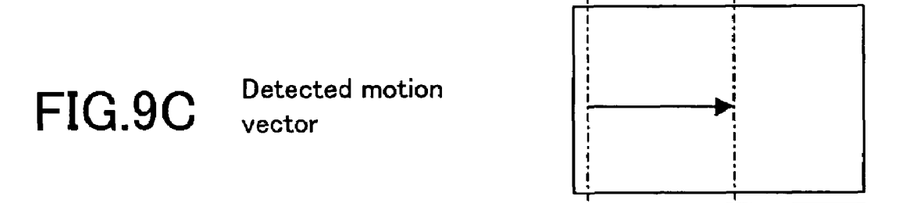
Figure 9D:
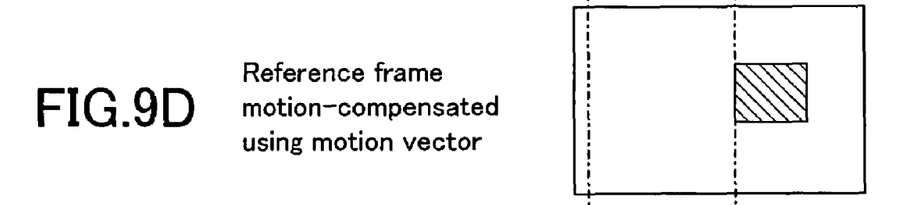
Figure 9E:
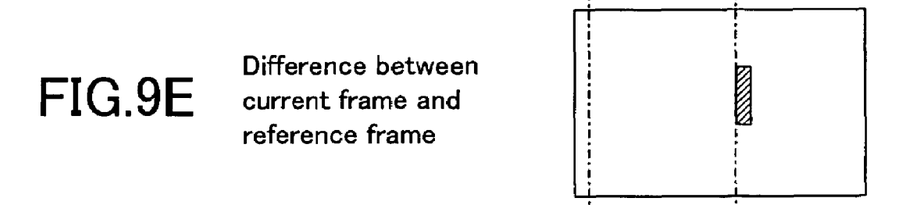
Figure 9F:
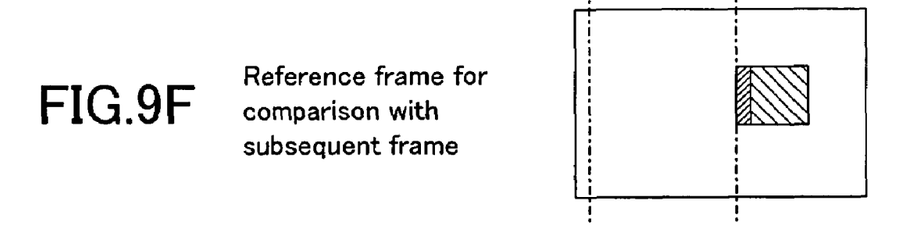

On the other hand, in the case of inter coding, the reference image frame (FIG. 9A) stored in the frame memory 58 and a current image frame (FIG. 9B) stored in the frame memory 52 are compared with each other in a motion detection section 59 and then a motion vector is obtained for each macroblock or for each frame (FIG. 9C). Then, motion compensation is performed to the reference image frame in a motion compensation section 60 using the motion vector so as to generate a reference frame (FIG. 9D) and a difference between the reference frame and the current image frame (FIG. 9E) is subjected to DCT, quantization and Huffman coding and then obtained data is transmitted. The detected motion vector is also subjected to Huffman coding and then transmitted. At this time, the inverse quantization and inverse DCT are performed to quantized difference data, and obtained data is added to motion compensation predictive data output from the motion compensation section 60 and then is stored in the frame memory 58. The obtained data is a predictive reference image frame for a subsequent frame (FIG. 9F).

As for known techniques, Reference 1 (U.S. Pat. No. 5,477,272) discloses a technique in which in motion detection, wavelet transform is performed to generate a size-reduced image and then a correction is made based on a motion vector obtained using the size-reduced image to obtain a final motion vector. Also, Reference 2 (U.S. Pat. No. 6,219,383) discloses a technique in which in motion detection, wavelet transform is performed to generate a size-reduced image, as in Reference 1, a motion vector obtained using the size-reduced image is compared with the motion vector of a macroblock located in the periphery of a target macroblock for search, and then a correction is made.

PROBLEMS TO BE SOLVED

In the known technique described in FIGS. 8 and 9, when a motion vector is obtained, in a reference image, a search range (e.g., with 48×48 pixels) is set in the periphery of a macroblock (e.g., with 16×16 pixels) for obtaining a motion vector. And then, while the macroblock is moved, a position in which the sum of absolute values of an inter-frame difference for each pixel is the smallest (i.e., a position in which an inter-frame correlation degree is the highest) is searched and detected as the end of a motion vector.

If the motion vector can not be detected within the search range (no evaluation value is lower than a predetermined value) because an image has a fast motion, "inter coding is not used but intra coding which generally has a large coding amount is performed" or "a motion vector with the minimum evaluation value is first obtained and then inter coding is performed using the motion vector".

However, in the former case, intra coding utilizes only spatial redundancy in an independent frame, and thus coding efficiency is, in general, lower than that of inter coding. Accordingly, a coding amount is largely increased. Moreover, in the latter case, the accuracy of the motion vector is low, and thus a difference between a current frame and a predictive frame is increased. Accordingly, a coding amount is increased as in the former case. That is to say, in either of the cases, a coding amount is increased, thus resulting in reduction in coding efficiency. Therefore, in order to increase coding efficiency, for example, a quantization step has to be increased to delete even information which influences image quality. This technique results in reduction in the image quality.

Moreover, to make it possible to detect a motion vector for an image with a fast motion, a search range may be set to be wider. In this case, however, as the search range is extended, a computational complexity for obtaining an evaluation value for an inter-frame correlation degree (the sum of absolute values of an inter-frame difference for each pixel) is largely increased, thus resulting in increase in a processing amount.

As described above, if inter-frame predictive coding is used in compressing a moving picture such as MPEG-1, MPEG-2 and MPEG-4, in general, a coding amount is increased when a fast motion occurs because of scene change or the like. Thus, coding at a low bit rate has been difficult.

Moreover, the above References 1 and 2 aim to improve accuracy in motion vector detection. That is to say, in motion detection, a size-reduced image in which noise components (high frequency components) are removed and which is in a low frequency region (lower hierarchy) is generated using wavelet transform and then a motion vector which has not been influenced by noise is obtained using the size-reduced image. Then, based on the motion vector, a correction is made to obtain a final motion vector of a current image (upper hierarchy). Accordingly, accuracy in motion detection is increased in this manner, so that coding at a low bit rate can be achieved.

However, in References 1 and 2, wavelet transform is repeated several times to hierarchically generate size-reduced images and hierarchically obtain a motion vector from these size-reduced images. Thus, a processing amount becomes much larger than before and, as a result, processing time for motion detection is increased, as well.

The increase in processing time for motion detection directly causes an increase in processing time for coding. Thus, for example, inconveniences such as a frame skip may be caused in coding a moving picture with a large size (with a high pixel count). Moreover, when processing speed is increased by increasing power consumption or other schemes, increase in processing time can be suppressed but such schemes are not suitable to coding a moving picture for mobile cameras for cellular phone or other cameras.

SUMMARY OF THE INVENTION

An object of the present invention is to improve, in image coding of a moving picture, matching accuracy in motion vector detection to suppress an increase in a processing amount while coding efficiency is maintained without reducing image quality, so that fast processing is achieved.

More specifically, according to the present invention, if no motion vector is detected in matching between a current image and a reference image, frequency transform is performed and then matching is performed between size-reduced images after the frequency transform to search a motion vector. Thus, the number of repeating frequency transform in motion detection can be suppressed to a minimum.

Moreover, if no motion vector is detected even in matching between the size-reduced images, it is determined to give up inter coding and to perform intra coding. As another option, frequency transform is repeatedly performed until a motion vector is detected. In this case, an upper limit is imposed on the number of repeating frequency transform. If frequency transform is performed the upper limit number of times and no motion vector is detected, it is determined to give up inter coding and to perform intra coding. Thus, determination on a coding scheme (inter coding or intra coding) to be employed is made in an early stage, so that fast processing can be achieved.

Moreover, if motion detection using frequency transform has been performed to a target macroblock for motion detection and a macroblock located in a position in a previous frame corresponding to that of a motion detection target macroblock or a macroblock adjacent to the target macroblock in the same frame, matching between the current image and the reference image is omitted, frequency transform is performed and then matching is performed between size-reduced images after the frequency transform. In this manner, a motion vector is searched. That is to say, whether or not to perform frequency transform is determined by referring to processing history, so that fast processing can be achieved.

More specifically, the present invention as an image coding method for coding a moving picture includes: a first step of detecting a motion vector for a current image to be coded using a reference image; a second step of performing motion compensation to the reference image using the motion vector; and a third step of coding, using orthogonal transformation, quantization and variable-length coding, a difference between the current image and the motion-compensated reference image, wherein the first step includes: performing matching between the current image and the reference image to perform a first search; and performing, if no motion vector is detected in the first search, substantially the same frequency transform to both of the current image and the reference image and then detecting a motion vector using size-reduced images generated by the frequency transform to each other.

In the present invention, if no vector is detected in a first search in which matching is performed between a current image and a reference image, substantially the same frequency transform is performed to the current image and the reference image and then matching is performed between size-reduced images generated by the frequency transform to each other. In this manner, a second search is performed. Thus, in the second search, a search range in which motion detection is performed is apparently extended, so motion vector detection in a larger range becomes possible. Also, a processing amount is not increased because the search range is not simply extended. As a result, even if an image has a large motion because of scene change or the like, matching accuracy in motion detection is improved and thus image quality is improved. At the same time, the probability that motion detection is given up and intra coding with a large coding amount is largely lowered. Therefore, it is possible to improve coding efficiency without reducing image quality, so that coding at low bit-rate can be achieved with high image quality.

Moreover, since a second search using size-reduced images generated by frequency transform is performed only when no motion vector is detected in matching between a current image and a reference image, the number of repeating frequency transform in motion vector detection is suppressed to a minimum. Thus, it is possible to achieve improvement of coding efficiency and fast coding processing at the same time.

Then, it is preferable that the first step of the image coding method of the present invention further includes determining, if no motion vector is detected in the second search, to code the current image by intra coding, instead of performing the second and third steps.

Thus, if no motion vector is not detected even in a second search, i.e., in motion vector search in a wider range, an image is considered to have a very fast motion, and then it is immediately determined to give up inter coding and to perform intra coding. That is to say, determination on a coding scheme is made in an early stage, so that fast processing can be achieved.

Moreover, it is preferable that in the first step of the image coding method of the present invention, if no motion vector is detected in the second search, the frequency transform is repeatedly performed until a motion vector is detected.

Thus, if frequency transform is repeatedly performed, a search range is extended, so that accuracy in motion detection is increased. Also, at the same time, if a motion vector is detected, the frequency transform is not further performed and thus the number of repeating frequency transform in motion vector detection is suppressed to a minimum.

Furthermore, it is preferable that in the first step, if the frequency transform is repeated a predetermined number of times and then no motion vector is detected, it is determined to code the current image by intra coding, instead of performing the second and third steps.

Thus, if frequency transform is repeatedly performed, a search range is extended, so that accuracy in motion detection is improved, but the improved accuracy is traded off with processing time. Then, an upper limit is imposed on the number of repeating frequency transform. If no motion vector is detected in the range in which the number of repeating frequency transform is not over the upper limit, it is immediately determined to give up inter coding and to perform intra coding. That is to say, determination on a coding scheme is made in an early stage, so that fast processing can be achieved.

Moreover, it is preferable that in the first step of the image coding method of the present invention, whether or not to perform frequency transform to the current and reference image is determined, and if it is determined not to perform frequency transform and then no motion vector is detected in the first search, the second search is not performed and it is determined to code the current image by intra coding, instead of performing the second and third steps.

Thus, for example, when processing speed is prioritized, it is determined not to perform frequency transform. Even if no motion vector is detected in the first search, it is determined not to perform the second search and to perform intra coding. Thus, fast coding processing can be achieved.

Moreover, it is preferable that in the first step of the image coding method of the present invention, it is detected whether or not frequency transform has been performed in motion vector detection to a macroblock located in a position in a previous frame corresponding to that of a motion detection target macroblock, or a macroblock adjacent to the motion detection target macroblock in the same frame, and if frequency transform has been performed, the first search is not performed and the second search is performed.

Thus, if frequency transform has been performed to a macroblock located in a position in a previous frame corresponding to that of a motion detection target macroblock, it is considered that the macroblock had a fast motion. Therefore, considering the time correlation thereof, there is a high possibility that the motion detection target macroblock also has a fast motion. Moreover, if frequency transform has been performed to the macroblock adjacent to the motion detection target macroblock in the same frame, it is considered that the macroblock had a fast motion. Accordingly, considering the spatial correlation thereof, there is a high possibility that the motion detection target macroblock also has a fast motion. Therefore, assume that frequency transform has been performed to the macroblock located in the position in the previous frame corresponding to that of the motion detection target macroblock or the macroblock adjacent to the motion detection target macroblock in the same frame. If a first search is not performed and a second search using frequency transform is performed, process steps can be simplified, so that fast processing can be achieved.

More specifically, the present invention as an image coding apparatus for coding a moving picture includes: a detection block for detecting a motion vector for a current image to be coded using a reference image; a motion compensation section for performing motion compensation to the reference image using the motion vector detected by the motion detection block; and a coding block for coding, using orthogonal transformation, quantization and variable-length coding, a difference between the current image and the motion-compensated reference image, wherein the motion detection block includes: a first frequency transform section for performing a first frequency transform to the current image to generate a first size-reduced image; and a second frequency transform for performing a second frequency transform which is substantially the same as the first frequency transform to the reference image to generate a second size-reduced image, and the motion detection block is so configured to be able to detect a motion vector for the first size-reduced image by referring to the second size-reduced image.

According to the present invention, in the motion detection block, the first and second frequency transform sections perform substantially the same frequency transform to the current and reference images. Thus, a motion vector can be detected for a first size-reduced image generated by the frequency transform by referring to a second size-reduced image. Then, a search range in which motion detection is performed is apparently extended, so that motion vector detection in a larger range becomes possible. Also, a processing amount is not increased because the search range is not simply extended. As a result, even if an image has a large motion because of scene change or the like, matching accuracy in motion detection is improved and thus image quality is improved. At the same time, the probability that motion detection is given up and intra coding with a large coding amount is largely lowered. Therefore, it is possible to improve coding efficiency without reducing image quality, so that fast coding processing at low bit-rate can be achieved with high image quality.

DESCRIPTION OF THE PREFERRED EMBODIMENTS

Hereinafter, embodiments of the present invention will be described with reference to the accompanying drawings.

Note that in the following description, it is assumed for the purpose of simplification that a macroblock which is to be a motion vector target has (16×16) pixels and a search range in a known technique has (48×48) pixels. However, in the present invention, the number of pixels of a macroblock and search range of a motion vector are not limited thereto.

First Embodiment

Figure 1:
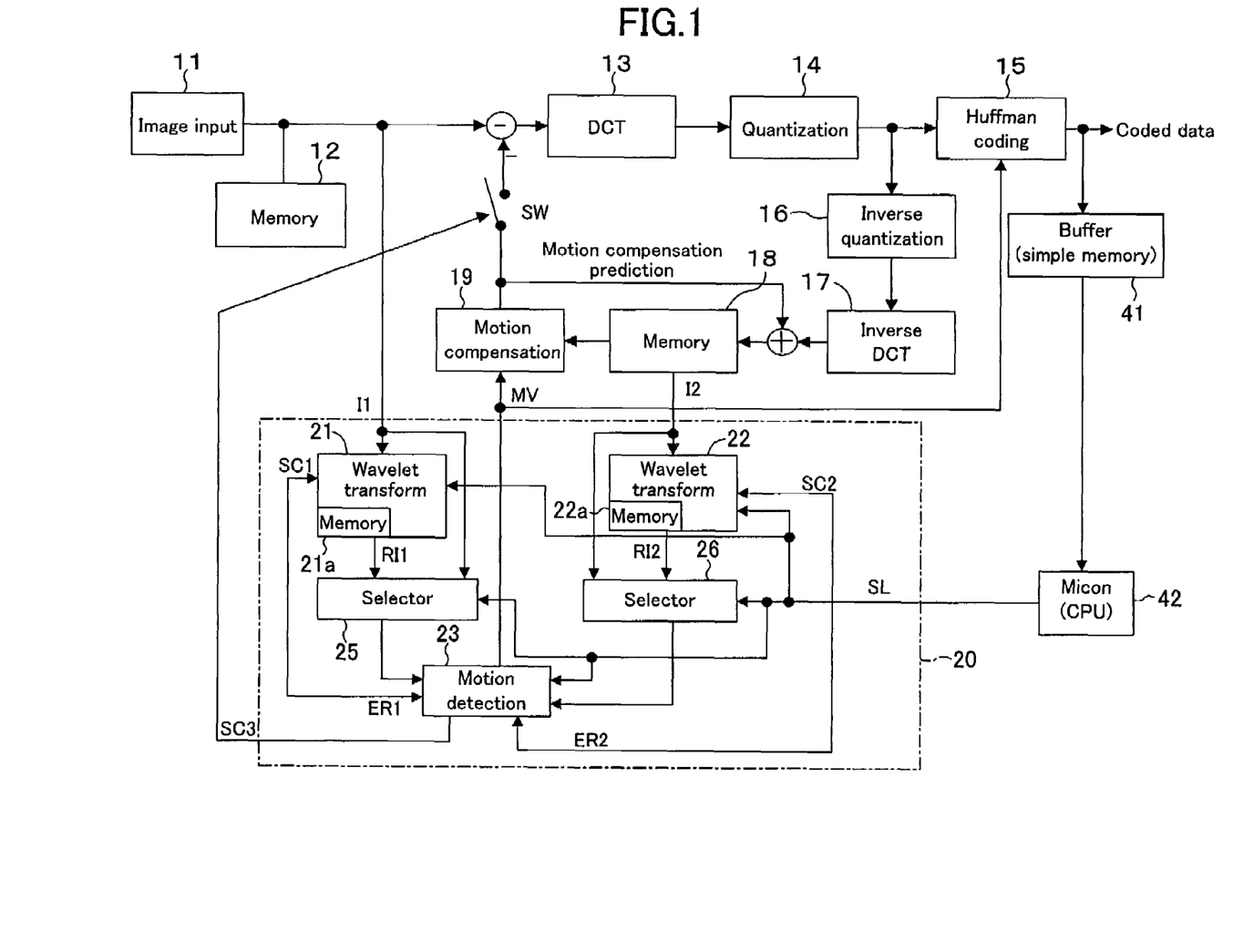
FIG. 1 is a block diagram illustrating the configuration of an image coding apparatus in accordance with a first embodiment of the present invention.

FIG. 1 is a block diagram illustrating the configuration of an image coding apparatus in accordance with a first embodiment of the present invention. In FIG. 1, an image signal received from an image input section 11 is temporarily stored in a frame memory 12. In the case of intra coding, the image signal stored in the frame memory 12 is coded by a DCT section 13, a quantization section 14 and a Huffman coding section 15 and then is transmitted as coded data. At this time, a quantization coefficient output from the quantization section 14 is decoded by an inverse quantization section 16 and an inverse DCT section 17 and then is stored in a frame memory 18. Meanwhile, in the case of inter coding, for the image signal stored in the frame memory 12, a difference from a reference image after motion compensation, i.e., an image obtained by motion-compensating a reference image stored in the frame memory 18 by a compensation section 19, is obtained. Then, the differential image is coded by the DCT section 13, the quantization section 14 and the Huffman coding section 15, and then transmitted as coded data. The DCT section 13, the quantization section 14 and the Huffman coding section 15 together form a coding block. Note that other orthogonal transformation methods may be used instead of DCT and other variable-length coding methods may be used as Huffman coding.

A motion detection block 20 detects, using a reference image I2 stored in the frame memory 18, a motion vector MV for a current image I1 to be coded and stored in the frame memory 12. In FIG. 1, the motion detection block 20 includes a first wavelet transform section 21 as a first frequency transform section, a second wavelet transform section 22 as a second frequency transform section, a motion detection section 23, a first selector 25 for selectively outputting the current image I1 or a size-reduced image RI1 output from the first wavelet transform section 21, and a second selector 26 for selectively outputting the reference image I2 or a size-reduced image RI2 output from the second wavelet transform section 22. The motion detection section 23 detects a motion vector using outputs from the first and second selectors 25 and 26.

A buffer memory 41 temporarily stores coded data output from the Huffman coding section 15. A micon (microcomputer) 42 monitors the amount of coded data stored in the buffer memory 41. Then, the micon 42 controls operations of the first and second selectors 25 and 26 with a selection control signal SL according to the monitored amount of coded data. Specifically, the micon 42 determines from the amount of a bitstream stored in the buffer memory 41 whether or not wavelet transform is needed. If the micon 42 determines that wavelet transform is needed, selective outputs from the first and second selectors 25 and 26 are set at the size-reduced images RI1 and RI2 output from the first and second wavelet transform section 21 and 22, respectively.

Figure 2A:
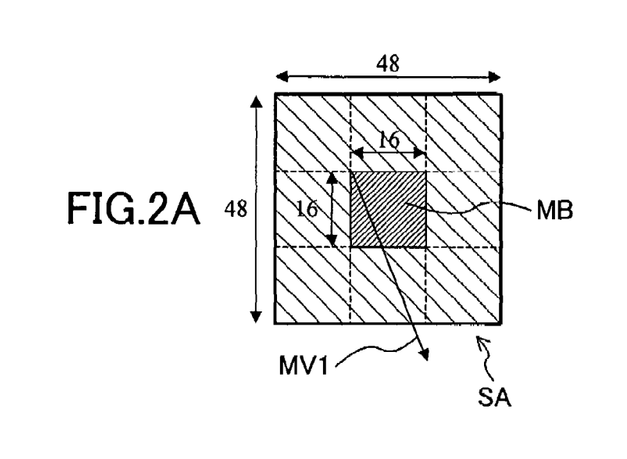
FIGS. 2A through 2C are illustrations for explaining wavelet transform.

Referring to FIG. 2, effects obtained by using wavelet transform for motion detection will be described. FIG. 2A illustrates the relationship between a macroblock MB in a current image and a search range SA in a reference image. The macroblock MB has (16×16) pixels, and the search range SA has (48×48) pixels and includes 9 macroblocks. Assume that in this case, a motion vector MV1 is out of the search range SA and thus is not detected in the search range SA.

Figure 2B:
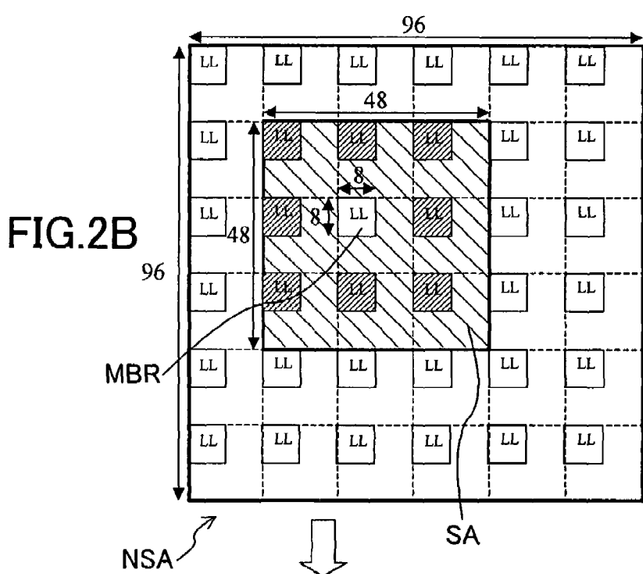

In this case, as shown in FIG. 2B, wavelet transform is performed to each of the current image and the reference image. With wavelet transform, band-division is performed to an image per macroblock. Then, when as for horizontal and vertical components, only low-frequency components (LL) are extracted, the size of each macroblock is reduced to a block size of (8×8) pixels. The macroblock MB of the current image is transformed into a size-reduced macroblock MBR. Thus, the amount of processing required for motion detection in the search area SA (e.g., for calculation of the sum of absolute values of pixel-differences) is actually reduced to one fourth of that in the known technique. In other words, a four times larger search range than that in the known technique can be achieved with the same processing amount.

Figure 2C:
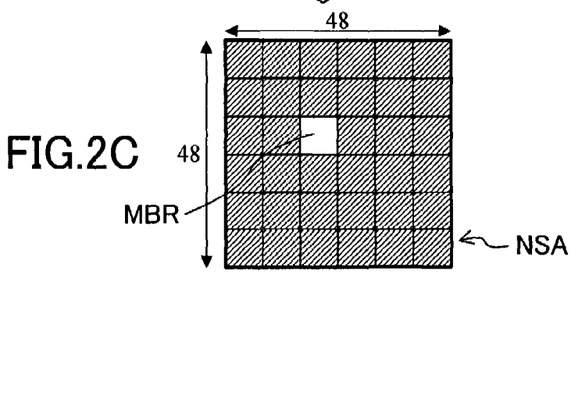

Specifically, as shown in FIG. 2B, motion detection can be performed for a search range NSA having (96×96) pixels, which is obtained by doubling the sizes of the original search range SA in the horizontal and vertical directions, respectively. The new search range NSA substantially has the same size as that of the original search range SA, i.e., (48×48) pixels, as shown in FIG. 2C. Then, the processing amounts of both of the ranges are totally the same.

As has been described, if wavelet transform is used in motion detection, a search range can be apparently extended. Thus, increase in processing amount is not caused and search in a wider range than that in the known technique becomes possible. This results in reduction in a matching error for a motion vector. Accordingly, motion compensation can be performed with high accuracy and an error from a predictive frame can be reduced. Therefore, increase in a coding amount can be suppressed and coding at a low bit-rate can be performed.

Moreover, wavelet transform may be repeated several times. Thus, the search range for a motion vector can be apparently extended further, and a motion vector can be more reliably detected even for an image with a fast motion. Accordingly, intra coding with poor coding efficiency is performed less frequently, so that coding at a low bit-rate can be achieved.

However, when wavelet transform is repeated several times, the search range is extended whereas the number of pixels of a macroblock on search is reduced. Therefore, if the repetition number is increased too much, contrary to expectation, accuracy in searching a motion vector decreases.

Figure 3A:
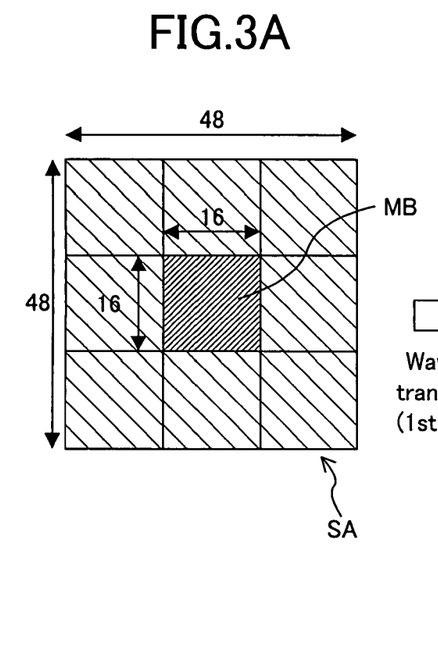
FIGS. 3A through 3C are illustrations for explaining effects obtained by repeating wavelet transform.
Figure 3B:
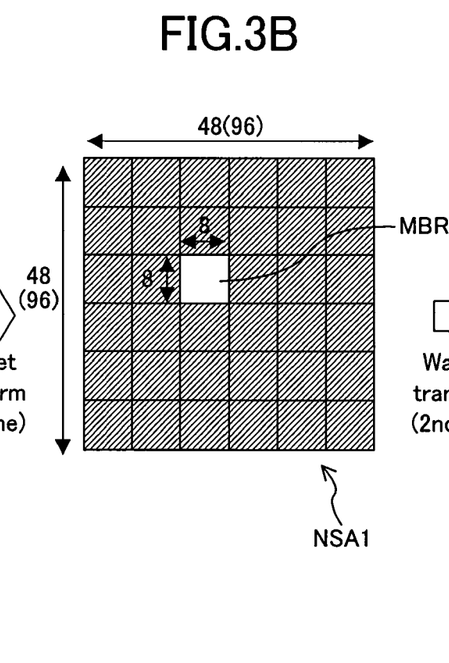
Figure 3C:
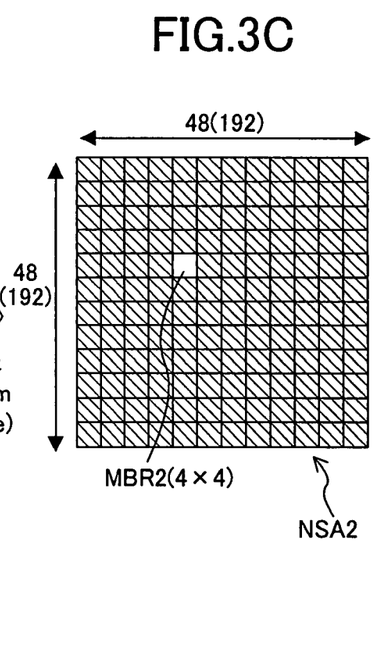

Motion detection is originally performed in the macroblock MB having (16×16) pixels and the search range SA having (48×48) pixels, as shown in FIG. 3A. However, if wavelet transform is repeated once, motion detection is performed in a size-reduced macroblock MBR1 having (8×8) pixels and a search range NSA1 apparently having (96×96) pixels, as shown in FIG. 3B. If wavelet transform is further repeated (i.e., repeated twice for total), motion detection is performed in a size-reduced macroblock MBR2 having (4×4) pixels and a search range NSA2 apparently having (196×196) pixels, as shown in FIG. 3C.

That is to say, when wavelet transform is performed n times, an apparent search range is extended by a factor of 4n whereas the pixel size of a macroblock is reduced to ¼n of the original size thereof. Therefore, if the transform performing number n is increased too much, contrary to expectation, accuracy in searching a motion vector decreases. Accordingly, image quality is deteriorated due to mismatching. Then, even when wavelet transform is repeatedly performed, an upper limit of the number of repeating wavelet transform is preferably determined. For this reason, in a second embodiment described later, a counter 24 which can set an upper limit UL of the number of repeating wavelet transform is provided.

Figure 10:
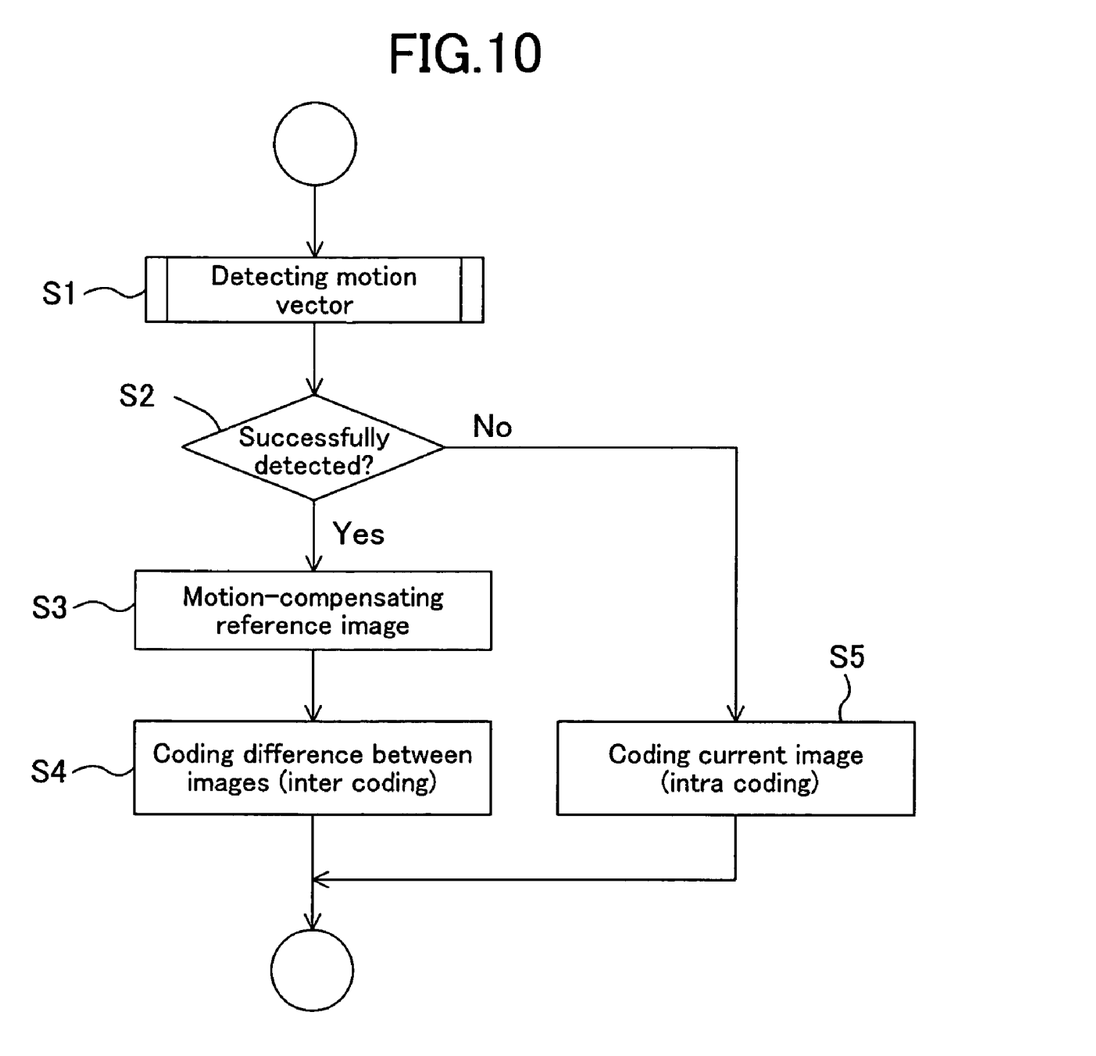
FIG. 10 is a flowchart showing a schematic flow of an image coding method in accordance with each of the embodiment of the present invention.

FIG. 10 is a flowchart showing an image coding method in accordance with this embodiment, that is, operations of the apparatus shown in FIG. 1. As shown in FIG. 10, a motion vector for the current image I1 to be coded is first detected using the reference image I2 (Step S1). Then, if a motion vector is successfully detected (Yes in Step S2), motion compensation is performed to the reference image using the detected motion vector (Step S3), and then inter coding, i.e., coding of a difference between the current image I1 and the motion-compensated reference image I2 is performed using orthogonal transformation, quantization and variable-length coding (Step S4). On the other hand, if a motion vector is not successfully detected (No in Step S2), intra coding, i.e., coding of the current image I1 is performed using orthogonal transformation, quantization and variable-length coding (Step S5).

Figure 4:
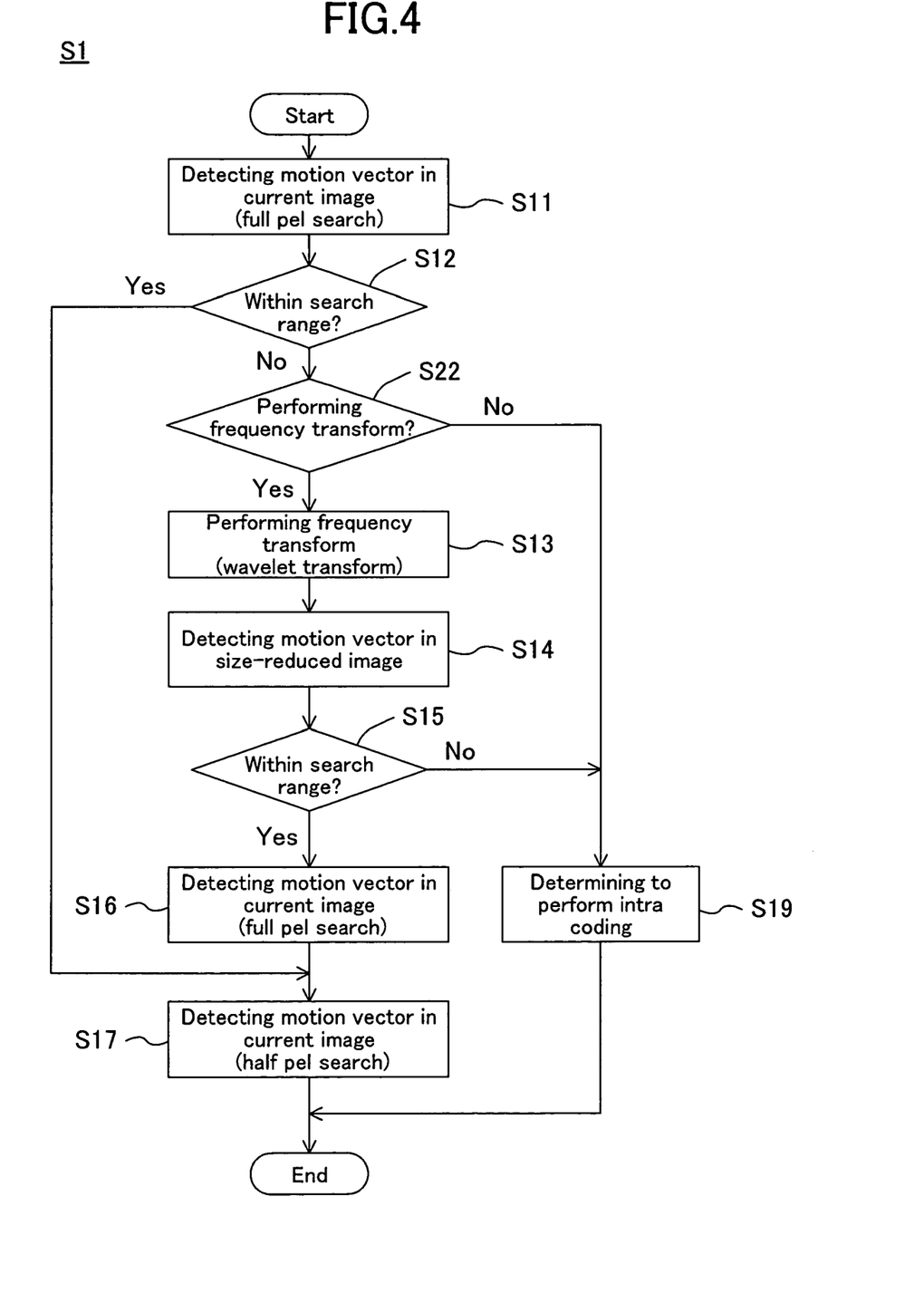
FIG. 4 is a flowchart showing operations of a motion detection block in a first embodiment of the present invention.

FIG. 4 is a flowchart showing processing of Step S1, that is, operations of the motion detection block 20 in this embodiment. As shown in FIG. 4, the motion detection section 23 first performs matching between the current image I1 and the reference image I2 to perform a first search for detecting a motion vector (S11). At this time, the first and second selectors 25 and 26 are set to selectively output the current image I1 and the reference image I2, respectively. Then, if a motion vector is detected within a search range (Yes in S12), motion vector detection every half pel (half pel search) is performed (S17) and then a detected motion vector MV is given to the motion compensation section 19 to finish the processing.

On the other hand, in Step S12, if it is determined that no motion vector is detected within the search range, the process will proceed with Step S13 and subsequent steps. Note that determination on whether or not a motion vector is detected within the search range is made by comparing evaluation values for a correlation degree (e.g., the sum of absolute values of differences) obtained in the matching with predetermined threshold value. For example, when every evaluation value is over the predetermined threshold value, it is determined that no motion vector is detected.

In Step S22, it is determined whether or not to perform motion vector detection using size-reduced images obtained by wavelet transform. The micon 42 determines from the amount of a bitstream stored in the buffer memory 41 whether or not motion vector detection using size-reduced images is needed, and outputs a selection control signal SL according to a determination result.

When it is determined that motion vector detection using size-reduced images is needed, the micon 42 outputs the selection control signal SL so that the first and second selectors 25 and 26 selectively output the size-reduced images RI1 and RI2 output from the first and second wavelet transform sections 21 and 22, respectively. At this time, wavelet transform is performed to the current image I1 and the reference image I2 (Step S13). More specifically, the first wavelet transform section 21 performs wavelet transform to the current image I1, thereby generating a first size-reduced image RI1, and the second wavelet transform section 22 performs wavelet transform to the reference image I2, thereby generating a second size-reduced image RI2. Then, the motion detection section 23 performs matching between the first size-reduced image RI1 and the second size-reduced image RI2 to perform a second search for detecting a motion vector (Step S14).

On the other hand, in Step S22, if it is determined that motion vector detection using size-reduced images is not needed or if fast coding processing is needed, the micon 42 outputs a selection control signal SL so that the first and the second selectors 25 and 26 selectively output the original current image I1 and the original reference image I2, respectively. Then, the process proceeds with Step S19 and it is determined that intra coding is to be performed. At this time, in the motion detection block 20, motion detection without using wavelet transform is performed. Thus, the probability of performing intra coding is increased. Accordingly, a coding amount is increased, but image quality is increased. Moreover, since wavelet transform is not performed, coding processing can be performed fast.

Furthermore, if wavelet transform is not needed, it is preferable to stop operations of the first and second wavelet transform sections 21 and 22 including the memories 21$a$ and 22$a$ by the micon 42. Thus, power consumption can be reduced.

Subsequently, in Step S15, it is determined whether or not a motion vector is detected within the search range. If a motion vector is detected (Yes), the position of a final motion vector is predicted to some degree by provisionally using the motion vector, and then integral pixel motion vector detection (full pel search) S16 and half pixel motion vector detection (half pel search) S17 are performed by the detection section 23. At this time, the first and the second selectors 25 and 26 are set to selectively output the current image I1 and the reference image I2, respectively. The following is the reason why in this case, the motion vector obtained from the size-reduced images after the wavelet transform is not used as a final motion vector but another motion vector detection is performed using original images. The image of LL components obtained by wavelet transform is an image sub-sampled in the horizontal and vertical directions, so that accuracy in search may have been deteriorated when compared with that in a known pixel search technique. That is to say, a motion vector with high detection accuracy can be reliably obtained by performing another motion vector using original images. More specifically, a motion vector obtained by performing wavelet transform n times (n: integral number) is only $2^n$ pixels in unit motion vector and thus has poor accuracy. Then, the current image and the reference image are read out from the obtained motion vector and then a position in which the sum of absolute values of pixel-differences is small is detected every pixel or every half pixel, so that a motion vector is obtained.

On the other hand, if no motion vector is detected within the search range even though wavelet transform has been performed (No in Step S15), it is determined that a fast motion is contained and further determined to give up inter coding and to perform intra coding (Step S19).

As has been described, according to this embodiment, wavelet transform is performed to a current image and a reference image, and thereby the search range for a motion vector can be apparently extended without increasing processing amount. Thus, it becomes possible to perform motion vector detection in a wider range. Therefore, even though an image has a large motion because of scene change or the like, matching accuracy in motion detection is increased and thus image quality is improved. At the same time, the probability that motion detection is given up and intra coding with a large coding amount is performed is largely lowered.

Moreover, determinations on whether or not a motion vector can be detected in a current image (S12), whether or not to perform frequency transform (S22) and whether or not a motion vector can be detected in size-reduced images after frequency transform (S15) are performed. Thus, determinations for motion detection processing are made in an early stage, and this embodiment can be applied to fast coding processing. Accordingly, it is possible to improve coding efficiency without reducing image quality, so that fast coding processing at low bit-rate can be performed with high image quality.

Note that in this embodiment, if as a result of motion vector determination in a current image, no motion vector is detected within a search range, wavelet transform is performed. However, without performing such determination, wavelet transform may be performed at the beginning. That is to say, Steps S11 and S12 may be omitted.

Moreover, a motion vector detected after wavelet transform may be used, as it is, as a final motion vector MV. That is to say, Steps S16 and S17 may be omitted.

Other Examples of Selector Control 1

Selection control of the selectors 25 and 26 in the motion detection block 20 may be performed by a selection control signal received from the outside of an apparatus. In this case, when a user sees an image, the user can determine whether or not to extend a motion detection range according to situations of various scenes, and then set, according to the determination, whether or not to perform wavelet transform.

For example, when an image has small variations (close to a static image), wide range motion vector detection is not needed. Thus, in order to perform fast motion vector detection processing, the user controls the selectors 25 and 26 to select the current image I1 and the reference image I2, respectively, so that wavelet transform is not to be performed. On the other hand, when an image has large variations, wide range motion vector detection is needed. Thus, the user controls the selectors 25 and 26 to select the size-reduced current image RI1 and the size-reduced reference image RI2, respectively, so that wavelet transform is to be performed. In this manner, when an image has large variations, a search range can be apparently extended, as in the above-described embodiment. In contrast, when an image has small variation and a search range is not needed to be extended, it is possible to reduce a processing amount by wavelet transform and thus perform fast coding processing.

Other Examples of Selector Control 2

Moreover, selection control of the selectors 25 and 26 in the motion detection block may be performed by the motion detection section 23. That is to say, in an initial state, the selectors 25 and 26 are set to selectively output the current image I1 and the reference image I2. Thus, the motion detection section 23 performs motion vector detection using the original current image I1 and the original reference image I2 which are not wavelet-transformed (Step S11).

Then, when a motion vector is detected within the search range (Yes in Step S12), the current image I1 is considered to have a small motion and then the motion vector is transmitted as a final motion vector MV to the motion compensation section 19. In this case, the selectors 25 and 26 are not particularly controlled.

On the other hand, when no motion vector is detected within the search range (No in Step S12), the current image I1 is considered to have a large motion. In this case, the motion detection section 23 controls the selectors 25 and 26 to change their respective selective outputs, so that the first and second size-reduced images RI1 and RI2 generated by the first and second wavelet transform sections 21 and 22 are selectively output (Step S13). Then, another motion vector is obtained from the first and second size-reduced images RI1 and RI2 (Step S14) and this another motion vector is output as a final motion vector MV to the motion compensation section 19.

With the above-described configuration, whether or not a motion detection range should be extended is determined in the apparatus according to situations of various scenes. Thus, control from the outside of the apparatus or a micon is not needed, i.e., the apparatus can be completed as a system by itself. Therefore, the configuration is suitable to hardware system design.

Second Embodiment

Figure 5:
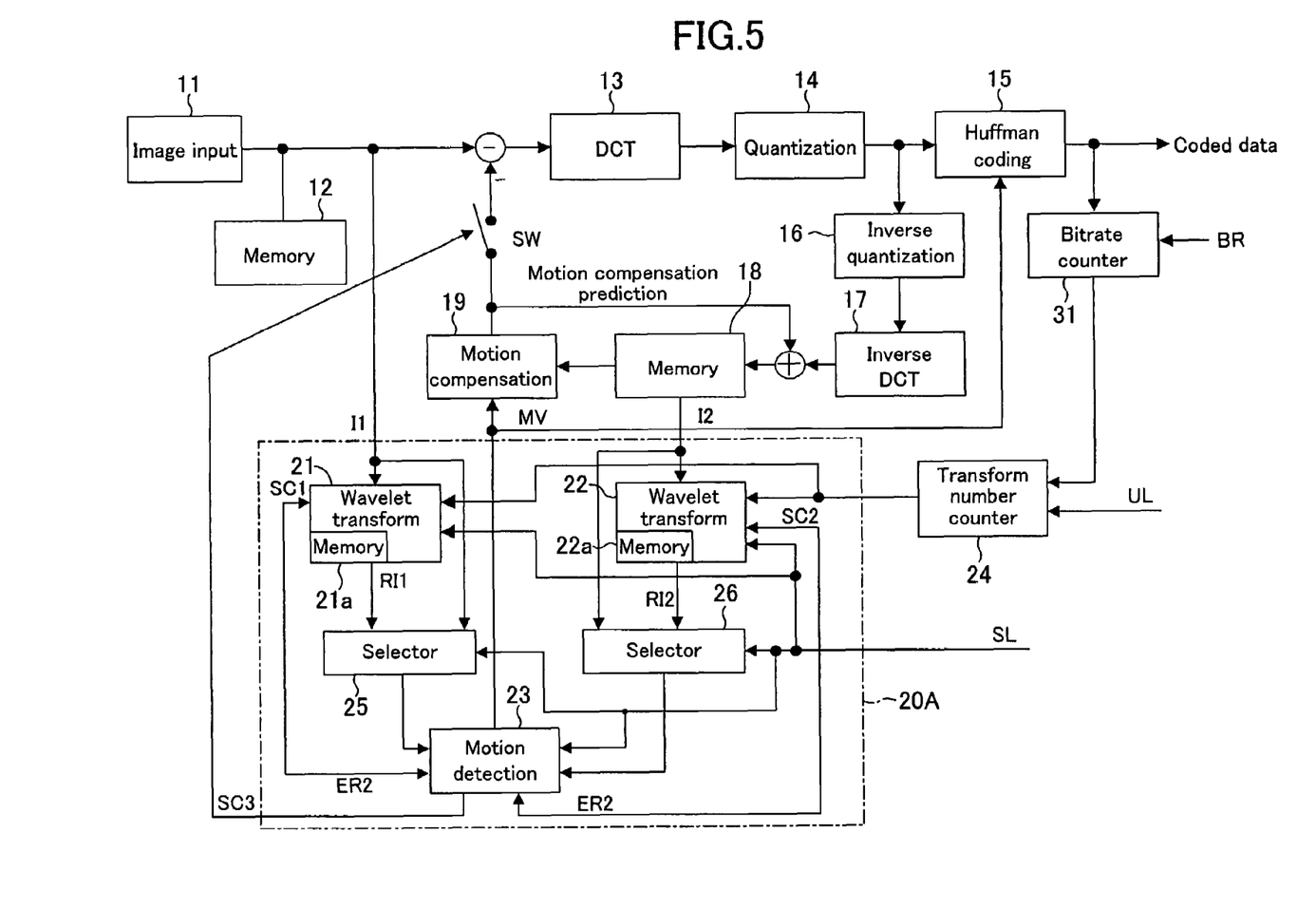
FIG. 5 is a block diagram illustrating the configuration of an image coding apparatus in accordance with a second embodiment.

FIG. 5 is a block diagram illustrating the configuration of an image coding apparatus in accordance with a second embodiment of the present invention. In FIG. 5, each element also shown in FIG. 1 is identified by the same reference numeral, so that detail description of each element will be omitted. In FIG. 5, a bit-rate counter 31 for counting the amount of coded data (bitstream amount) after process in the Huffman coding section 15 is provided and the number of repeating wavelet transform in a motion detection block 20A is controlled by an output from the bit-rate counter 31, thereby achieving rate control of a coding amount.

Normally, when a bit rate is desired to be reduced, a quantization coefficient is increased. In this case, however, image quality may be deteriorated. To cope with this, in this embodiment, the probability of detecting a motion vector is increased to reduce the ratio of intra coding. Thus, the bit rate is reduced. The bit-rate counter 31 is configured so as to be able to receive from the outside a control signal BR for setting upper and lower limits of a coding amount which a user desires.

That is to say, when a bitstream amount after Huffman coding is over the upper limit because images have fast motion, the bit-rate counter 31 controls the wavelet transform sections 21 and 22 so that the number of repeating wavelet transform is increased.

When the user desires to increase coding efficiency (i.e., coding at low bit rate), the user may set the upper limit of a coding amount at a smaller value by the control signal BR. When the user desires to reduce coding efficiency so as to improve image quality even only slightly (i.e., when the number of macroblocks to be coded by intra coding is increased) or when fast motion-detection processing is desired to be performed (i.e., when the number of repeating wavelet transform is reduced), the user may set the lower limit of a coding amount at a larger value by the control signal BR.

Figure 6:
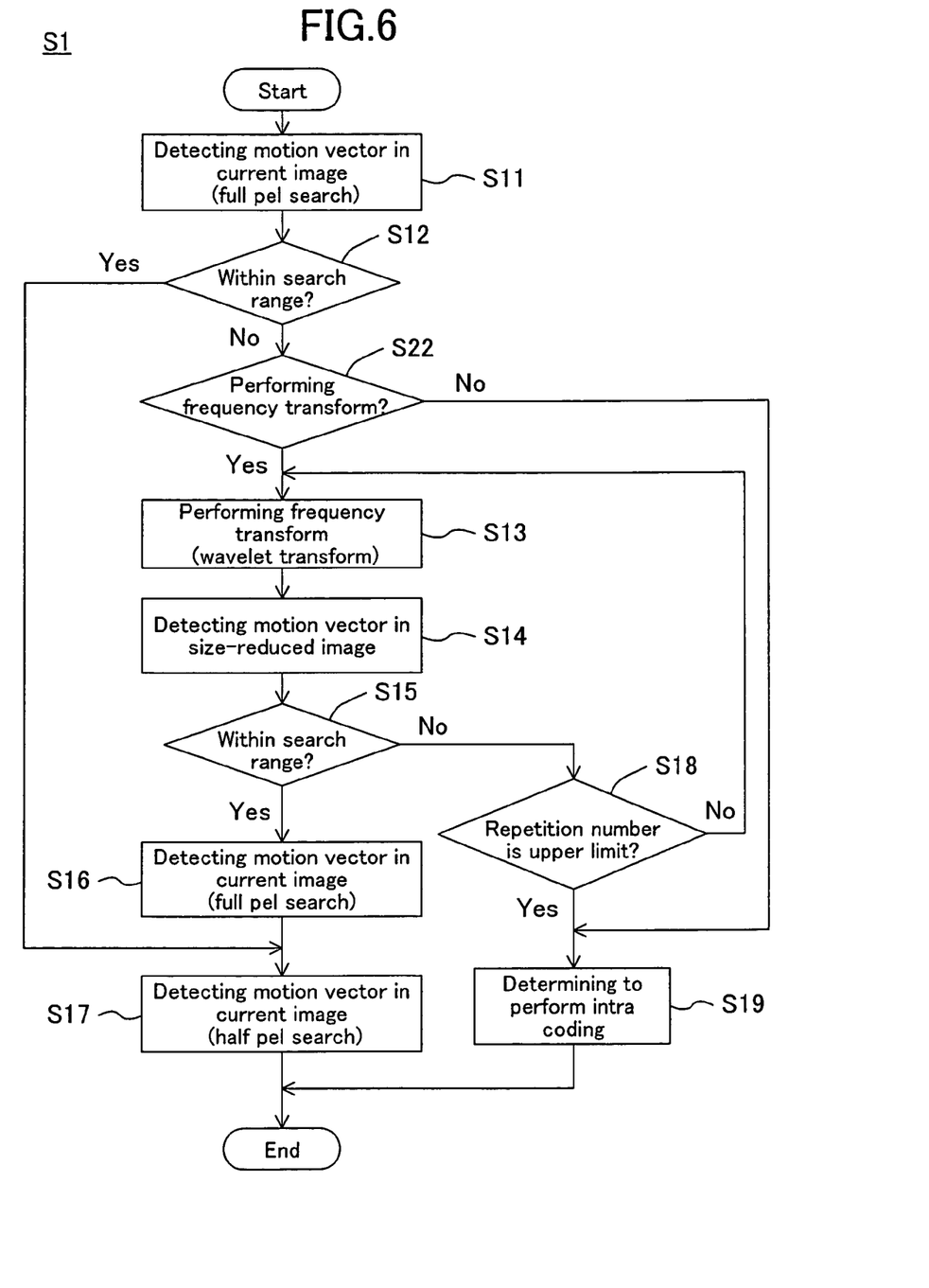
FIG. 6 is a flowchart showing operations of a motion detection block in the second embodiment.

An image coding method in accordance with this embodiment, i.e., operations of the apparatus of FIG. 5 are basically the same as shown in FIG. 10. FIG. 6 is a flowchart showing processing in Step S1 of FIG. 10 in accordance with this embodiment, that is, operations of the motion detection block 20A. Here, the description of steps described also in the first embodiment will be omitted. When wavelet transform is performed in Steps S13 and S14 and no motion vector is detected within a search range (No in S15), wavelet transform is performed again and motion vector detection is performed (S13 and S14). The first and second wavelet transform sections 21 and 22 include memories 21a and 22a for temporarily storing transform results, respectively, so that wavelet transform can be repeated multiple times. The motion detection section 23 instructs with control signals SC1 and SC2 the first and second wavelet transform sections 21 and 22 to perform wavelet transform again. That is to say, a motion vector can be more reliably detected even for an image with a fast motion by repeatedly performing wavelet transform. Accordingly, intra coding with poor coding efficiency is performed less frequently, so that coding at a low bit-rate can be achieved.

Assume that even if wavelet transform is repeated, no motion vector is detected within the search range. If the repetition number reaches an upper limit UL (Yes in S18), it is determined that a current image has a very large motion and then intra coding is to be performed (S19). The upper limit UL is set at a counter 24. Then, when the repetition number reached the upper limit UL, the first and second wavelet transform sections 21 and 22 transmit error signals ER1 and ER2, respectively, to the motion detection section 23. Thereafter, the motion detection section 23 turns a switch SW OFF with a control signal SC3. In this manner, intra coding is performed.

Note that the counter 24 is so configured that the upper limit UL for the number of repeating wavelet transform can be set from the outside of the apparatus. Thus, the user can adjust the upper limit of the number of repeating wavelet transform while seeing image quality. Moreover, by specifying the number of repeating wavelet transform, this embodiment can be applied to fast processing.

As described, according to this embodiment, a user inputs a limit value for a coding amount from the outside of the apparatus, and thereby rate control of a bitstream can be performed. Moreover, rate control which is normally performed by adjusting quantization step value can be performed by controlling the number of repeating wavelet transform in motion detection. Furthermore, by adjusting the repetition number, processing time for coding can be adjusted in a simple manner.

Note that when wavelet transform is repeatedly performed, the frame memories 12 and 18 may be accessed every time so that wavelet transform is performed multiple times at a strech. In this case, the memories 21a and 21b for temporarily storing transform results are not necessarily provided in the first and second wavelet transform sections 21 and 22.

Third Embodiment

In a third embodiment of the present invention, in determining whether or not to perform frequency transform in motion vector detection, it is detected whether or not frequency transform has been performed to a macroblock processed before a target macroblock. A detection result is used in the determination. An exemplary configuration of an image coding apparatus in accordance with this embodiment is basically the same as that shown in FIG. 5, but operations of the motion detection block 20A are different from those in the second embodiment.

Figure 7:
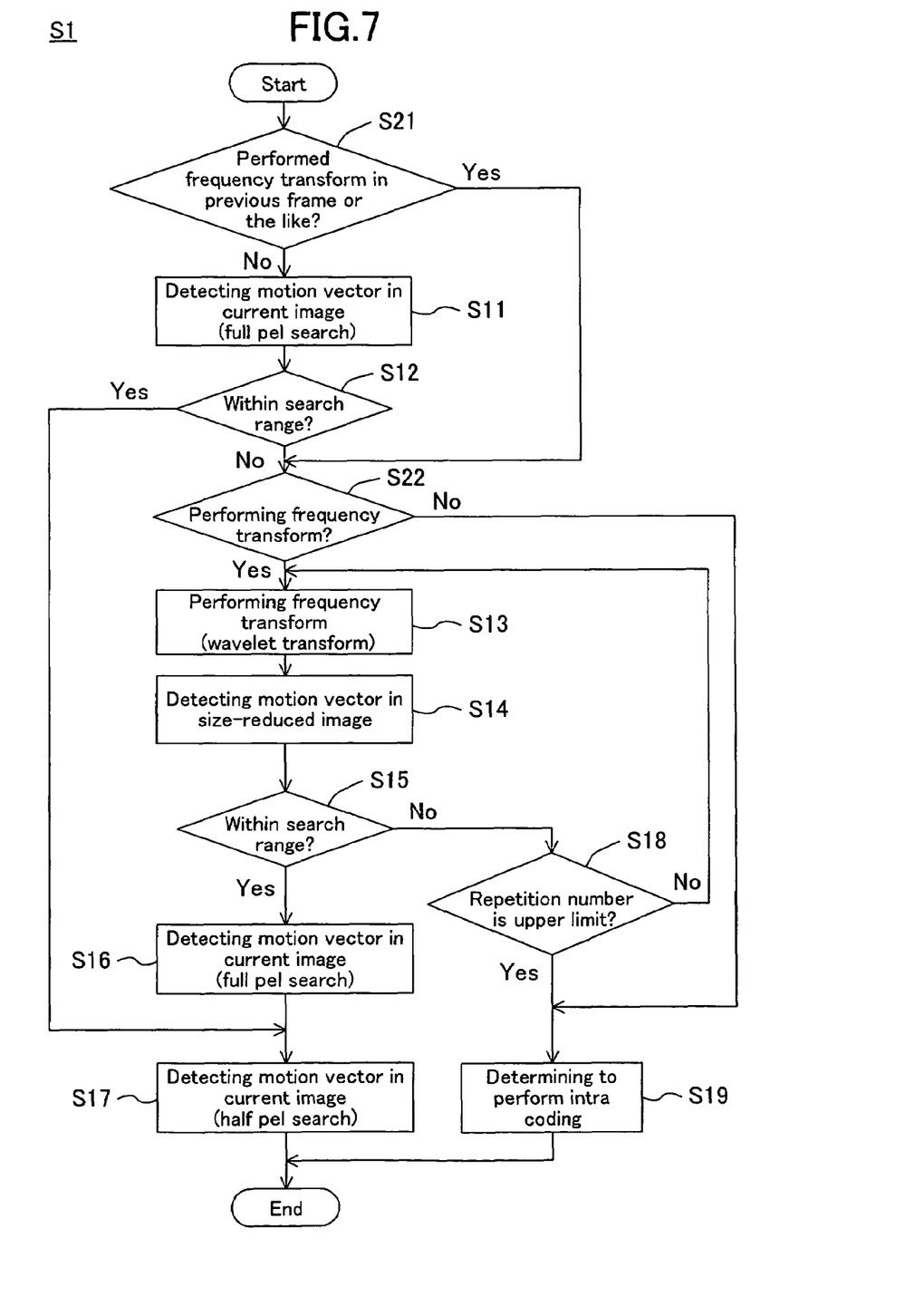
FIG. 7 is a flowchart showing operations of a motion detection block in a third embodiment of the present invention.

An image coding method of this embodiment is basically the same as that shown in FIG. 10. FIG. 7 is a flowchart showing processing of Step S1 of FIG. 10, that is, operations of the motion detection block 20A in this embodiment. In FIG. 7, Step S21 is added to the flowchart of FIG. 6. More specifically, as pre-processing for motion detection, the motion detection section 23 detects whether or not wavelet transform has been performed in motion vector detection to a macroblock in a frame previous to a current image or a macroblock which is adjacent to a motion detection target macroblock and has been coded (Step S21). The motion detection 23 stores, for the determination performed in Step S21, whether or not it has instructed to perform wavelet transform for each frame.

Then, if wavelet transform has been performed to the macroblock in the previous frame, or in the macroblock adjacent to the target macroblock in the same frame and coded by inter coding (Yes in Step S21), the process will skip Steps S11 and S12 and proceed with Step S22. As for subsequent process, the same process as in the second embodiment are performed. On the other hand, if wavelet transform has not been performed in the previous frame or the like, motion vector detection is performed with the original current image (Step S11) in the same manner as in the first and second embodiments. As for subsequent process steps, the same process steps as shown in the second embodiment are performed.

In this manner, whether or not wavelet transform has been performed to a previous image is used as feedback for determining whether or not to perform wavelet transform to the current image. Thus, when frames with fast motions continuously occur, whether or not to perform wavelet transform can be quickly determined.

Note that in each of the above-described embodiments, wavelet transform is used as frequency transform for obtaining a size-reduced image. However, the present invention is not limited thereto. For example, pre-filter (no limit is imposed on the number of taps) or other frequency transform techniques may be used.

As described above, according to the present invention, a search range for motion detection can be apparently extended. Thus, even if an image has a large motion because of scene change or the like, matching accuracy in motion detection is improved and thus image quality is improved. At the same time, the probability that motion detection is given up and intra coding with a large coding amount is largely lowered. Accordingly, it is possible to improve coding efficiency without reducing image quality, so that fast coding processing at low bit-rate can be performed with high image quality.

Moreover, since frequency transform is performed only when no motion vector is detected in matching between a current image and a reference image, the number of repeating frequency transform in motion vector detection can be suppressed to a minimum. Thus, fast processing can be performed. Furthermore, when no motion vector is detected even after frequency transform has been performed or frequency transform has been repeatedly performed for a predetermined number of times, it is determined to perform intra coding. Or it is determined from processing history of macroblocks having high spatial or time correlation with the target macroblock to perform frequency transform. Thus, fast processing can be achieved.

With image coding method and apparatus in accordance with the present invention, it is possible to achieve fast processing while coding efficiency is maintained without reducing image quality. Therefore, the inventive method and apparatus are useful for moving picture coding for mobile cameras or the like.

What is claimed is:

1. An image coding method for coding a moving picture, comprising:
    a first step of detecting a motion vector for a current image to be coded using a reference image;
    a second step of performing motion compensation to the reference image using the motion vector; and
    a third step of coding, using orthogonal transformation, quantization and variable-length coding, a difference between the current image and the motion-compensated reference image and producing coded data,
    wherein the first step includes:
        performing a first search by matching between the current image and the reference image;
        determining whether a motion vector is detected in the first search; and
        performing, only when no motion vector is detected in the first search,
    wavelet transform to both of the current image and the reference image, and then matching between size-reduced images generated by the wavelet transform to each other to perform a second search.

2. The method of claim 1, wherein the first step further includes determining, if no motion vector is detected in the second search, to code the current image by intra coding, instead of performing the second and third steps.

3. The method of claim 1, wherein the orthogonal transformation is DCT.

4. The method of claim 1, wherein the variable-length coding is Huffman coding.

5. The method of claim 1, wherein the first step further includes obtaining a final motion vector for the current image by provisionally using a motion vector detected in the second search and referring to the reference image.

6. The method of claim 1, wherein in the first step, if no motion vector is detected in the second search, the wavelet transform and matching between the size-reduced images are repeatedly performed until a motion vector is detected.

7. The method of claim 6, wherein in the first step, if the wavelet transform and matching between the size-reduced images are repeated a predetermined number of times and then no motion vector is detected, it is determined to code the current image by intra coding, instead of performing the second and third steps.

8. The method of claim 7, further comprising a fourth step of measuring the coding amount of the coded data,
wherein the predetermined number is set according to the coding amount measured in the fourth step.

9. The method of claim 1, wherein in the first step,
whether or not to perform the wavelet transform to the current and reference images is determined, and
if it is determined not to perform the wavelet transform and then no motion vector is detected in the first search, the second search is not performed and it is determined to code the current image by intra coding, instead of performing the second and third steps.

10. The method of claim 1, wherein in the first step,
it is detected whether or not the wavelet transform has been performed in motion vector detection to a macroblock located in a position in a previous frame corresponding to that of a motion detection target macroblock, or a macroblock adjacent to the motion detection target macroblock in the same frame, and
if the wavelet transform has been performed, the first search is not performed and the second search is performed.

11. An image coding apparatus for coding a moving picture, comprising:
a detection block for detecting a motion vector for a current image to be coded using a reference image;
a motion compensation section for performing motion compensation to the reference image using the motion vector detected by the motion detection block;
a coding block for coding, using orthogonal transformation, quantization and variable-length coding, a difference between the current image and the motion-compensated reference image and producing coded data; and
a microcomputer for determining whether motion vector detection using size-reduced images is needed,
wherein the motion detection block includes:
a first wavelet transform section for performing a first wavelet transform to the current image to generate a first size-reduced image; and
a second wavelet transform for performing a second wavelet transform which is substantially the same as the first wavelet transform to the reference image to generate a second size-reduced image, and
the motion detection block is so configured to be able to detect a motion vector for the first size-reduced image by referring to the second size-reduced image.

12. The apparatus of claim 11, wherein
the motion detection block includes a counter at which an upper limit for the number of repeating wavelet transform can be set from outside of the apparatus, and
each of the first and second wavelet transform sections has an upper limit of the number of repeating the first or second wavelet transform to a current image or a reference image, the upper limit being set at the counter.

13. The apparatus of claim 11, wherein the motion detection block is so configured to be able to change its operation between performing motion vector detection to the first size-reduced image and performing motion vector detection to the current image.

14. The apparatus of claim 13, wherein the first and second wavelet transform sections stop their respective operations when the motion detection block performs motion vector detection to the current image.

15. The apparatus of claim 13, further comprising:
a buffer memory for temporarily storing the coded data output from the coding block; and
a control section for monitoring a coding amount stored in the buffer memory and instructing, based on the coding amount, the motion detection block to perform motion vector detection to the first size-reduced image or to the reference image.

16. The method of claim 1, wherein determining whether a motion vector is detected in the first search is made by comparing evaluation values for a correlation degree obtained in the matching of the first search with a predetermined threshold value.

* * * * *